Patented Jan. 1, 1952

2,580,683

UNITED STATES PATENT OFFICE 2,580,683

CAPSULES FILLED WITH AQUEOUS SOLUTIONS AND METHOD OF PREPARING THE SAME

Pieter Kreuger, Bussum, Netherlands, assignor to N. V. Moutsuikerindustrie & Extractiebedrijf Maltostase, Weesp, Netherlands, a corporation of the Netherlands No Drawing. Application January 6, 1948, Serial No. 813. In the Netherlands January 11, 1947

11 Claims. (Cl. 99—165)

This invention relates to gelatin capsules filled with aqueous solutions and to the method of preparing and filling said capsules.

It is well known that only such solutions which do not affect the wall of the capsule may be introduced into capsules. In general, therefore, capsules cannot be filled with aqueous solutions or materials containing any large amount of free moisture. Particularly this is true in the case of capsules consisting of gelatin. Attempts have been made to overcome this difficulty by filling gelatin capsules instead of with aqueous solutions with emulsions of water in oil or fat. This, however, completely modifies the character of the contents of the capsules and often interferes with the use of the contents for medicinal or other purposes as the material is converted to a liquid with oily properties instead of aqueous properties.

I have found that it is possible to fill capsules with aqueous solutions containing more than 10% of water. In order to obtain this result, care must be taken that the aqueous solution contains a sufficient quantity of hygroscopic materials to prevent attack on the walls of the capsule by the aqueous solution.

When trying to fill gelatin capsules with sugar syrup it appears that the capsules already dissolve during the filling and, therefore, are not durable at all. The same thing is found in using commercial maltose- and glucose-syrups. If, however, the content of dry material of commercial maltose-syrup or commercial glucose-syrup is raised, which may be done by concentrating the syrup, the gelatin capsules filled with the product thus obtained appeared to be completely durable. They may be stored during long periods of time in a moist or dry atmosphere, without undergoing any change. Gelatin capsules with maltose-syrup appear to be very resistant when the content of dry materials is 83%. For glucose-syrup this figure is 87% of dry materials. In the case of sugar syrups it has also been possible to raise the content of dry material to the extent of obtaining durable capsules filled therewith. The content of dry material in this case, however, had to be raised to at least 92%, which causes technical difficulties in filling the capsules due to the high viscosity of the mass.

The differences between these syrups are accounted for by their different content of low molecular dextrins. These, as is well known, are hygroscopic materials. Sugar syrup contains only a small quantity of these lower dextrins, so that this syrup must be further concentrated than the maltose- or glucose-syrup in order to enable them to serve as a filling for gelatin capsules.

Maltose-syrup contains less dextrin than glucose-syrup, it is true, but these dextrins are much further broken up. Therefore the quantity of lower dextrins, which for the present process are the important ones, in the maltose-syrup is much greater than that in the glucose-syrup, so that the percentage of dry material in the maltose-syrup used as a filling for gelatin capsules need only be 83%, whereas in the glucose-syrup it must be 87%.

When the glucose-syrup is further broken up, which may be done both enzymatically and chemically, to a content of about 55% of glucose, the syrup shows the same properties as the maltose-syrup. That is to say, that the glucose-syrup treated in this way need only comprise about 83% of dry substance in order to impart good durability to gelatin capsules filled therewith. In said enzymatical or chemical treatment of the syrup there is also formed a greater quantity of lower dextrins, whereby the amount of hygroscopic substances is increased.

It is obvious, that not only syrups comprising a sufficient amount of hygroscopic dextrins may be used as a filling for capsules, but also extracts of substances of vegetable or animal origin containing sufficient hygroscopic materials. These substances need not necessarily be dextrins. It is also possible to make syrups or extracts, in general aqueous solutions, which normally could not be used in gelatin capsules, suitable as a filling for capsules by addition thereto of hygroscopic substances. As maltose-syrup contains sufficient low molecular hygroscopic dextrins, it may be added to make said aqueous or moisture containing materials suitable as a filling for capsules. Also both organic and inorganic substances, such as, for example, pectins, hygroscopic calcium- and magnesium-salts, may be added. It is also possible to add lower dextrins which for this purpose may be isolated from syrups containing a sufficient quantity thereof, in a simple way. Thus it is not necessary to concentrate syrups, which do not contain sufficient low molecular dextrins, but the same effect may be obtained by the addition to the syrups of hygroscopic substances, as for example, low molecular dextrins.

In practice it is of the first importance to use as aqueous solutions for capsules, solutions containing as low a content of dry material as possible so that the viscosity of these liquids is lower. This may be obtained by the addition of hygroscopic substances to the solution. Furthermore, it has been found that the effect thereof may be increased by the addition of non-hygroscopic water soluble substances to the wall of the capsule. Particularly in the case of gelatin capsules it is preferred to use sugars for this purpose. The addition of sugar to the wall of the capsule is known per se. This process was applied in order to harden the wall of gelatin capsules filled with oily liquids. It was, however, not in the least obvious to apply this process to capsules filled with aqueous solutions as it could be expected that the sugar containing wall would surrender its sugar to the liquid in a short period of time. Surprisingly this appeared not to be the case. Moreover the wall was not hardened, but remained supple. A further effect of this process was that the aqueous solution may now contain less dry material while the sugar does remain in the wall. Thus, for example, maltose-syrup containing 80% of dry material may be used as a filling liquid for gelatin capsules, when 1 part of sugar for each part of gelatin has been added to the wall. With the same wall the minimum content of dry material for glucose-syrup is 83%. For sugar-syrup this content is now 85%. In all cases the wall remains supple and maintains its original sugar content. The capsules are completely durable.

Raising the sugar content of the wall permits a further lowering of the required content of dry material of the solution. This, however, causes the difficulty that the wall loses in suppleness. This difficulty applies mainly to capsules, which are not used as a whole, but are emptied by squeezing. In addition to the sugars water soluble plasticizers are therefore added to the wall, such as, for example, polyvalent alcohols and derivatives thereof. In the case of gelatin capsules it is preferred to use glycerin for this purpose.

A capsule with a wall containing for each part of gelatin 1 part of sugar and 0.5 part of glycerin may be filled with a maltose-syrup comprising only 78% of dry material, the wall being more supple than a wall comprising sugar only. These filled capsules are also completely stable both in a moist and in a dry atmosphere. The sugar and the glycerin remain in the wall.

The present process permits the introduction of various substances such as, for example, essences, coloring matter and remedies into capsules in aqueous solutions without using emulsions, which in general are more difficult to prepare and are more expensive. Moreover these emulsions are prepared with the aid of substances with an alkaline reaction permitting the introduction into the emulsions only of those substances, which are resistant to alkali. This is especially important in the case of remedies, which must be administered in aqueous solution and have an objectionable taste or are not alkali-resistant. Aqueous extracts of vegetable or animal origin may also be readily administered in this form. Various articles of food may further be provided in this way with water soluble volatile taste substances. This may be done by introducing the taste substance in a capsule, which dissolves in the preparation of the food. Another method is packing squeezable supple capsules together with the articles of food.

*Example 1*

A filling for gelatin capsules was prepared containing:

97% maltose-syrup (80% dry material).
0.75% menthol.
Some Eucalyptus oil.
Some bromoform.
Some ephedrin-chlorohydrate.

With this composition gelatin capsules are filled, which are composed of:

4 parts gelatin.
4 parts sugar.
6.5 parts water.

The thus filled capsules are completely stable.

*Example 2*

The filling mixture consists of:

99.5% maltose-syrup.
0.5% $ZnCl_2$.

With this mixture gelatin capsules of the following composition are filled:

4 parts gelatin.
6 parts sugar.
2 parts glycerin.
0.5 parts salt.
6.5 parts water.

Again completely stable filled capsules are obtained.

*Example 3*

A filling for gelatin capsules is composed of:

13% malt extract.
25% honey.
0.3% $NH_4Cl$.
0.05% ephedrin-chlorohydrate.
0.025% codein.
0.01% Oil of Anise.
0.01% Oil of Foeniculi.
0.06% Extract Primulae (1:10).
Rest: Syrup of Thyme.

With this composition gelatin capsules were filled which are prepared as designed in Example 1.

*Example 4*

Three hundred and ninety grams of yeast was plasmolyzed with 255 grams maltose-syrup or malt extract at 45° C. Then the water was evaporated until the content of dry material was 60 to 75%. This syrup was filled with or without addition of one or more vitamins of the B-complex, into gelatin capsules, composed as in Example 1.

*Example 5*

The filling mixture is composed of:

53% maltose-syrup.
45% coffee-essence.
3% bitter substance, such as tannin.

It was filled into capsules composed of:

4 parts gelatin.
4 parts sugar.
2 parts glycerin.
6.5 parts water.

*Example 6*

The filling mixture was composed of:

21.65 parts gentian violet.
43.3 parts maltose-syrup (with 80% dry material).
20 parts water.

It was brought into capsules composed as in Example 2.

*Example 7*

The filling composition consists of:

20 parts naphthyl-acetic acid.
30 parts maltose-syrup.
10 parts water.

and brought in capsules composed of:

4 parts gelatin.
4 parts sugar.
2 parts glycerin.
6.5 parts water.

*Example 8*

A filling was composed of:

1% boric acid.
16.7% stovarsol (containing 4 - oxy - 3 - acetyl-aminophenyl-arsenic acid).
82.3% maltose-syrup (with 70% dry material).

This mixture was filled in gelatin capsules composed as in Example 2.

In each of the above examples a filled capsule is produced which is stable in both dry and moist atmosphere.

Various modifications and changes may be made in the above examples without departing from the spirit of the invention or the scope of the appended claims.

I claim:

1. A stable gelatin capsule inclosing an aqueous solution having hygroscopic material present in a quantity of a magnitude preventing deterioration of the capsule by the aqueous constituent of the solution.

2. A stable water soluble gelatin capsule constructed of a water soluble gelatin and a non-hygroscopic water soluble substance inclosing an aqueous solution of an ingredient compounded with a hygroscopic substance in a quantity of a magnitude preventing deterioration of the capsule.

3. A stable water soluble gelatin capsule constructed of a water soluble gelatin and sugar inclosing an aqueous solution of an ingredient having present a hygroscopic substance in a quantity of a magnitude preventing the aqueous content from attacking the walls of the capsule.

4. A stable water soluble gelatin capsule having its shell constructed of a water soluble gelatin and a water soluble plasticizer and inclosing an aqueous solution of an ingredient compounded with a hygroscopic substance in a quantity in a magnitude preventing deterioration of the capsule.

5. A stable water soluble gelatin capsule having its shell constructed of a water soluble gelatin, sugar, and glycerin inclosing an aqueous solution of an ingredient compounded of a hygroscopic substance in a quantity of a magnitude preventing deterioration of the capsule.

6. A stable water soluble gelatin capsule inclosing an aqueous solution of an ingredient compounded with a quantity of a low molecular dextrin preventing deterioration of the capsule.

7. A stable water soluble gelatin capsule filled with a sugar syrup having a low molecular dextrin content present in a quantity of a magnitude preventing the aqueous content of the solution from attacking the walls of the capsule.

8. A stable water soluble gelatin capsule constructed of a water soluble gelatin and sugar inclosing an ingredient dissolved in a maltose syrup having a low molecular dextrin content preventing deterioration of the capsule by the aqueous content of the syrup.

9. The method of producing stable gelatin capsules containing an aqueous solution comprising forming an aqueous solution of the material to be incorporated in the capsule compounded with a hygroscopic ingredient in a quantity of a magnitude preventing deterioration of the capsule by the aqueous content of the solution and inclosing the aqueous solution in a gelatin capsule.

10. The method of producing stable water soluble gelatin capsules containing aqueous solutions comprising mixing an aqueous sugar solution of the material to be capsulated with a hygroscopic ingredient in a quantity preventing attack on the walls of the capsules by the aqueous content of the sugar solution and capsulating said aqueous solution in a water soluble gelatin composition.

11. The method of producing a stable gelatin capsule containing aqueous solutions comprising dissolving the material to be capsulated in a sugar syrup with a dextrin content of a magnitude preventing deterioration of the capsule by the aqueous content of the syrup and capsulating the syrup in a water soluble gelatin composition.

PIETER KREUGER.

REFERENCES CITED

The following references are of record in the file of this patent:

UNITED STATES PATENTS

| Number | Name | Date |
|---|---|---|
| 1,758,089 | Shirriff | May 13, 1930 |
| 2,218,592 | Taylor | Oct. 22, 1940 |
| 2,234,479 | Scherer | Mar. 11, 1941 |
| 2,477,742 | Hall | Aug. 2, 1949 |

FOREIGN PATENTS

| Number | Country | Date |
|---|---|---|
| 436,236 | Great Britain | Oct. 8, 1935 |